United States Patent
Su

(10) Patent No.: US 8,836,188 B2
(45) Date of Patent: Sep. 16, 2014

(54) MOTOR WITH INTERNAL DRIVER

(75) Inventor: Wei-Chung Su, Taichung (TW)

(73) Assignee: Yen Shen Electronic Ind. Co., Ltd., Taichung (TW)

( * ) Notice: Subject to any disclaimer, the term of this patent is extended or adjusted under 35 U.S.C. 154(b) by 150 days.

(21) Appl. No.: 13/586,234

(22) Filed: Aug. 15, 2012

(65) Prior Publication Data

US 2013/0342084 A1 Dec. 26, 2013

(30) Foreign Application Priority Data

Jun. 26, 2012 (TW) .............................. 101212272 A

(51) Int. Cl.
*H02K 5/15* (2006.01)

(52) U.S. Cl.
USPC ............................... 310/89; 310/406; 310/410

(58) Field of Classification Search
USPC ............. 310/89, 90, 400, 404–408, 410, 422, 310/425
IPC ......................................................... H02K 5/15
See application file for complete search history.

(56) References Cited

U.S. PATENT DOCUMENTS

| | | | | |
|---|---|---|---|---|
| 1,799,071 A | * | 3/1931 | Smith | 310/88 |
| 4,499,391 A | * | 2/1985 | Sakamoto | 310/89 |
| 5,532,533 A | * | 7/1996 | Mizutani | 310/68 B |
| 5,945,766 A | * | 8/1999 | Kim et al. | 310/268 |
| 5,969,448 A | * | 10/1999 | Liu et al. | 310/90 |
| 2010/0133935 A1 | * | 6/2010 | Kinugawa et al. | 310/89 |
| 2011/0193430 A1 | * | 8/2011 | Takada | 310/43 |
| 2012/0025636 A1 | * | 2/2012 | Roopnarine | 310/46 |

FOREIGN PATENT DOCUMENTS

TW I322522 3/2010

* cited by examiner

*Primary Examiner* — Dang Le

(74) *Attorney, Agent, or Firm* — Muncy, Geissler, Olds & Lowe, P.C.

(57) ABSTRACT

A motor with an internal driver having a shell, having a stator, a rotor and a drive shaft attached to said rotor in an internal thereof; a front cover; a rear cover; ends of a drive shaft penetrating through holes of the front and rear covers to the external. The inner surface of the rear cover includes outer and inner circumferential walls and a receiving space defined by the outer and inner circumferential walls and the inner surface of the rear cover. A driver is provided within said receiving space and the outer surface of the rear cover is provided with a bearing slot to receive a bearing. An inner diameter of the inner circumferential wall is greater than the drive shaft. Said inner diameter of said inner circumferential wall is smaller than the annular diameter of the bearing in the bearing slot.

11 Claims, 8 Drawing Sheets

MOTOR WITH INTERNAL DRIVER

BACKGROUND OF THE INVENTION

1. Technical Field

The present invention is related to a motor, in particular, to a motor with an internal driver such that the driver is arranged in an internal of the motor and provided at a rear cover thereof.

2. Description of Related Art

For a common and known motor, it typically includes a stator and a rotor arranged within a shell as well as front and rear covers provided on the front and rear ends of the motor. As a driver is to be provided for the motor, an outer cap is mostly used and is further attached to the rear cover such that the electronic components of the driver can be arranged at the inner surface of the outer cap. By such arrangement, the driver can be firmly attached to the motor while the outer cap is able to provide protection to the electronic components of the driver.

Nevertheless, the abovementioned arrangement of the driver onto a typical or known motor requires additional outer cap at the external of the motor, which inevitably increases the number of component parts required and also causes the material costs to be greater while introducing complications to the assembly of such motor.

Taiwanese Patent No. 1322522 discloses a structure having a motor with a fan. The drawings of the patent illustrates that the center of the inner surface of the rear cap can be provided with a receiving slot to receive a bearing and the driver can be provided in a space formed between the receiving slot of the inner surface of the rear cap and the outer wall. Such structure requires no additional outer cap by arranging and providing the driver as well as the bearing on the inner surface of the rear cap directly. In comparison to the previously mentioned known motor, such structure requires less material cost and simplifies the complexity of the assembly.

However, the arrangement of the bearing on the inner surface of the rear cap as disclosed by the abovementioned patent can, in fact, occupy a significant volume of the inner surface of the rear cap, which poses limitations to the attachment or placement of the electronic components of the driver as the volume of these electronic components is limited. Since no electronic components of large volume can be placed therein due to the size limitation, the output of the motor is also affected and is therefore reduced.

SUMMARY OF THE INVENTION

An objective of the present invention is to provide a motor with an internal driver such that the inner surface of the motor receiving the driver therein is provided with an enlarged volume to accommodate not only electronic components of the driver but also electronic components that are of larger volumes.

Accordingly, the present invention provides a motor with an internal driver comprising: a shell, having a stator, a rotor and a drive shaft attached to said rotor in an internal thereof; a front cover, covering a front end of said shell, and said front cover having a through hole formed thereon; a rear cover, covering a rear end of said shell, and defining an inner surface on a side attached to said internal of said shell and an outer surface on another side exposed externally, said rear cover having a through hole formed thereon; two ends of said drive shaft penetrating said through holes of said front and rear covers respectively and exposed externally; and wherein said inner surface of said rear cover comprises an outer circumferential wall provided on an edge thereof, and an inner circumferential wall provided on an edge of said through hole, a receiving space is defined by said outer circumferential wall, said inner surface of the rear cover and said inner circumferential wall; a driver arranged within said receiving space and comprises a circuit board and a plurality of electronic components; said outer surface of the rear cover is provided with a bearing slot indented inwardly to receive a bearing therein, and said bearing slot is aligned with said through hole of said rear cover; an inner diameter of said inner circumferential wall is greater than the drive shaft to allow said drive shaft to pass therethrough, and said inner diameter of said inner circumferential wall is smaller than an annular diameter of said bearing received within said bearing slot.

Preferably, a top edge of said inner circumferential wall and a top edge of said outer circumferential wall are of same height.

Preferably, a top edge of said inner circumferential wall is higher than a top edge of said outer circumferential wall.

Preferably, said receiving space is filled with an encapsulant and is cured such that said encapsulant fills said space including the circuit board and electronic components of the driver, said inner circumferential wall, said outer circumferential wall and said inner surface of said rear cover, and said encapsulant is of a height less than top edges of said inner and outer circumferential walls.

Preferably, said circuit board of said driver is attached to said inner surface of said rear cover via a plurality of supporting spacers, such that the circuit board of said driver is spaced apart from the inner surface of said rear cover.

Preferably, insulations are provided between said inner circumferential wall and said circuit board of the driver and between said outer circumferential wall and said circuit board of the driver.

Preferably, the motor with an internal driver further comprises a fan, provided on an end of said drive shaft and external to said rear cover.

Preferably, the motor with an internal driver further comprises an outer cap, covering said rear cover and encompassing said fan therein.

Preferably, said outer and inner circumferential walls are formed on said inner surface of the rear cover along a normal direction thereof.

Preferably, said inner surface of the rear cover comprises an outer circumferential slot and an inner circumferential slot, said outer and inner circumferential walls are ring-shaped plates inserted into said outer and inner circumferential slots respectively.

Preferably, wherein said outer surface of said rear cover is provided with a plurality of heat-dissipating ribs.

DESCRIPTION OF EMBODIMENTS OF THE INVENTION

To describe the structures and technical features of the present invention in detail, the following preferred embodiments are presented with reference to the accompanied drawings.

Figure 1:
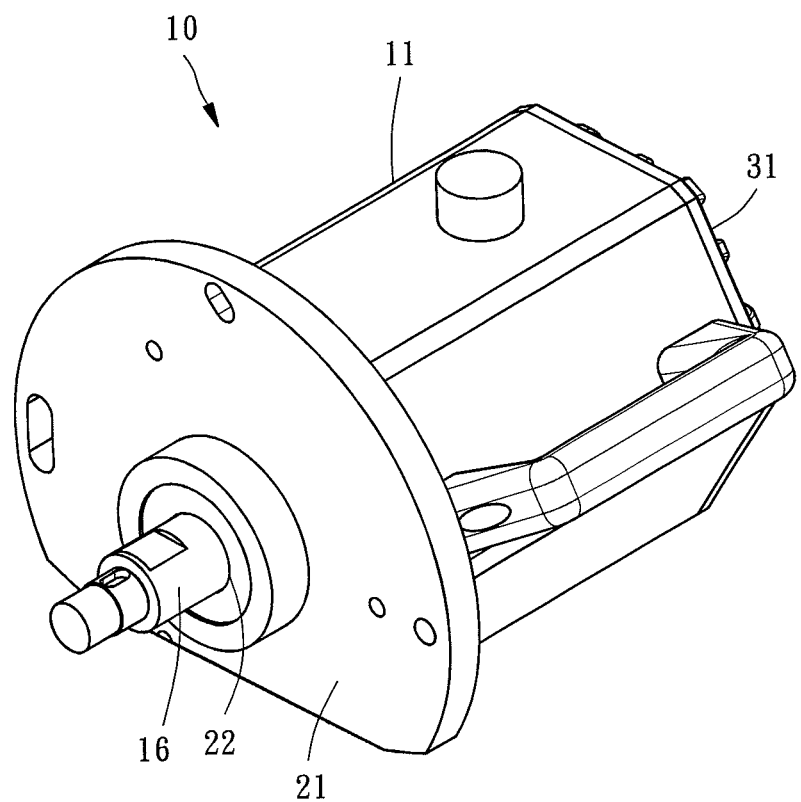
FIG. 1 shows a perspective view of an assembly of a first preferred embodiment of the present invention.
Figure 2:
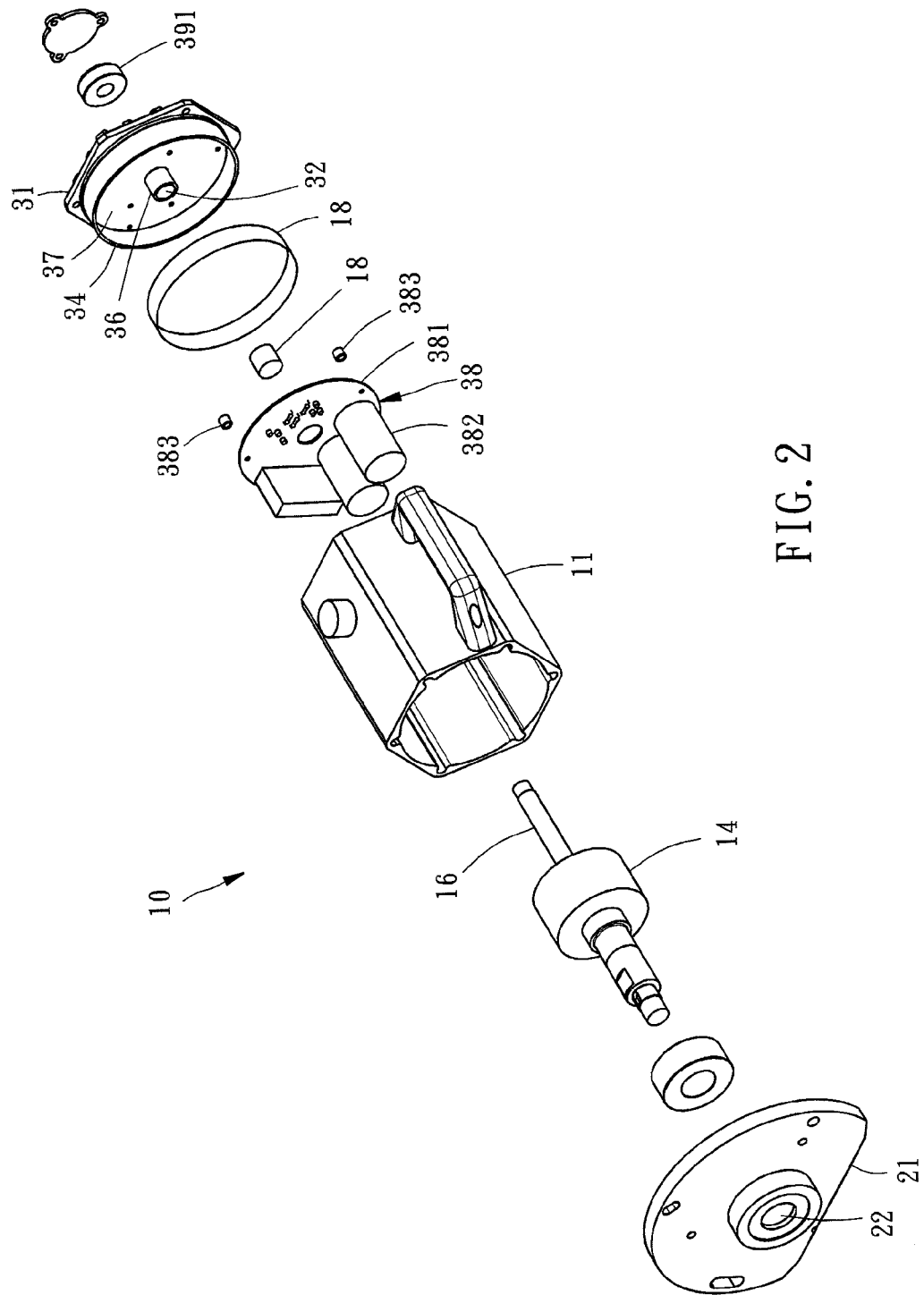
FIG. 2 shows an exploded view of a first preferred embodiment of the present invention.
Figure 3:
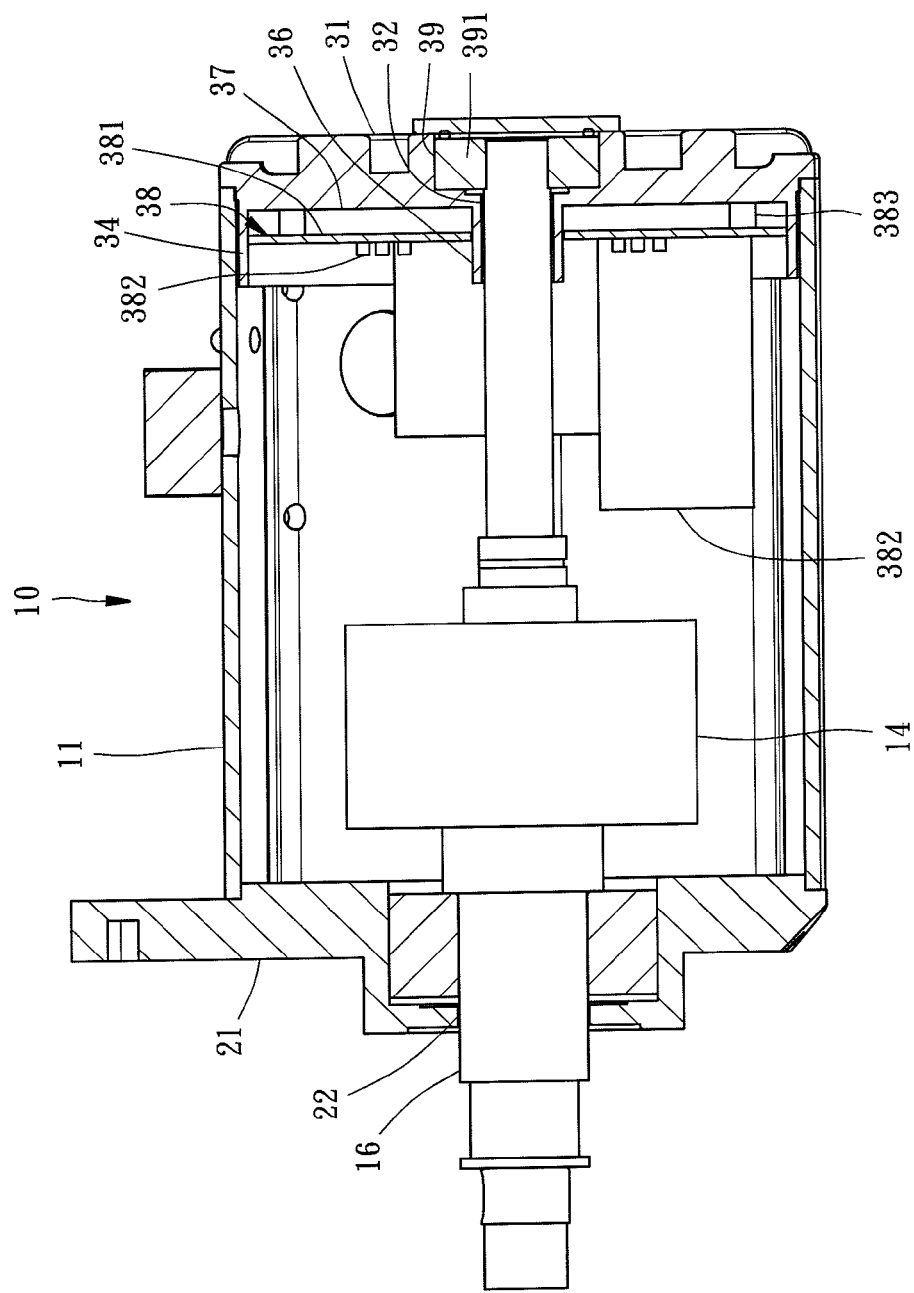
FIG. 3 shows a sectional view along line 3-3 in FIG. 1.

FIGS. 1~3 show a preferred embodiment of the present invention of a motor 10 with an internal driver, said motor 10 comprises a shell 11, a front cover 21 and a rear cover 31; wherein:

Said shell 11 includes a stator (not shown in the figures), a rotor 14 and a drive shaft 16 attached to said rotor 14 in an internal thereof. Since a stator is a commonly known part to a person skilled in the art, it is omitted in the figures and illustration thereof.

The front cover 21 covers a front end of said shell 11 and is provided with or has a through hole 22 formed thereon.

The rear cover 31 covers a rear end of said shell 11 and defines an inner surface on a side attached to said internal of said shell 11 and an outer surface on another side exposed externally; said rear cover 31 is provided with or has a through hole 32 formed thereon.

Two ends of said drive shaft 16 penetrates said through holes 22, 32 of said front and rear covers 21, 31 respectively and exposed externally.

The first embodiment of the present invention is characterized in that said inner surface of said rear cover 31 comprises an outer circumferential wall 34 provided on an edge thereof, and an inner circumferential wall 36 provided on an edge of said through hole 32, a receiving space 37 defined by said outer circumferential wall 34, said inner surface of the rear cover 31 and said inner circumferential wall 36. In this embodiment, said outer and inner circumferential walls 34, 36 are formed on said inner surface of the rear cover 31 along a normal direction thereof.

The driver 38 is arranged within said receiving space 37 and comprises a circuit board 381 and a plurality of electronic components 382. In this embodiment, the circuit board 381 is attached to said inner surface of said rear cover 31 via a plurality of supporting spacers 383, such that the circuit board 381 of the driver 38 is spaced apart from the inner surface of said rear cover 31. By such configuration, the effect of having the circuit board 381 being insulated from the inner surface of the rear cover 31 can be achieved. Instead of the use of the supporting spacers 383, a circuit board having a bottom with insulation can too be used to be received directly in the receiving space 37; in other words, the embodiment of the present invention shall not be limited to the use of said plurality of supporting spacers 383.

The outer surface of the rear cover 31 is provided with a bearing slot 39 indented inwardly to receive a bearing 391 therein, and the bearing slot 39 is aligned with the through hole 32 of the rear cover 31.

The inner diameter of the inner circumferential wall 36 is greater than the drive shaft 16 to allow said drive shaft 16 to pass therethrough, and the inner diameter of the inner circumferential wall 36 is smaller than an annular diameter of the bearing 391 received within the bearing slot 39.

In view of the abovementioned structure and configuration, it can be understood that by arranging the bearing slot 39 on the external surface of the rear cover 31, the annular diameter of the inner circumferential wall 36 at the inner surface of the rear cover 31 can be designed or configured to be of a size large enough to accommodate the drive shaft 16 and to allow the drive shaft 16 to penetrate therethrough without worries of the attachment of the bearing 391 thereon. Therefore, the annular diameter of the inner circumferential wall 36 can be minimized, which in turn allows the volume of the receiving space 37 to be maximized. With a maximized volume, the receiving space 37 can accommodate not only the electronic components 382 of the driver 38 but also electronic components 382 that are of a larger size and volume, meaning that a greater power of driver 38 can be used and accommodated to provide a motor with a greater power output.

As shown in FIG. 2, in one embodiment of the present invention, insulations 18 (presented by way of an example as insulating plates in FIG. 2) are provided between said inner circumferential wall 36 and said circuit board 381 of the driver 38 and between said outer circumferential wall 34 and said circuit board 381 of the driver 38. The circuit board 381 is therefore insulated from the inner and outer circumferential walls 36, 34 such that the occurrence of short circuits between the electronic components 382 of the circuit board 381 and the rear cover 31 can be prevented. It can however be understood that the insulations 18 are not necessary components since it is possible to achieve the desired effect of insulation by reducing the size or surface area of the circuit board 381 to increase the distance between the circuit board 381 and the inner and outer circumferential walls 36, 34 and to achieve such insulation.

Figure 4:
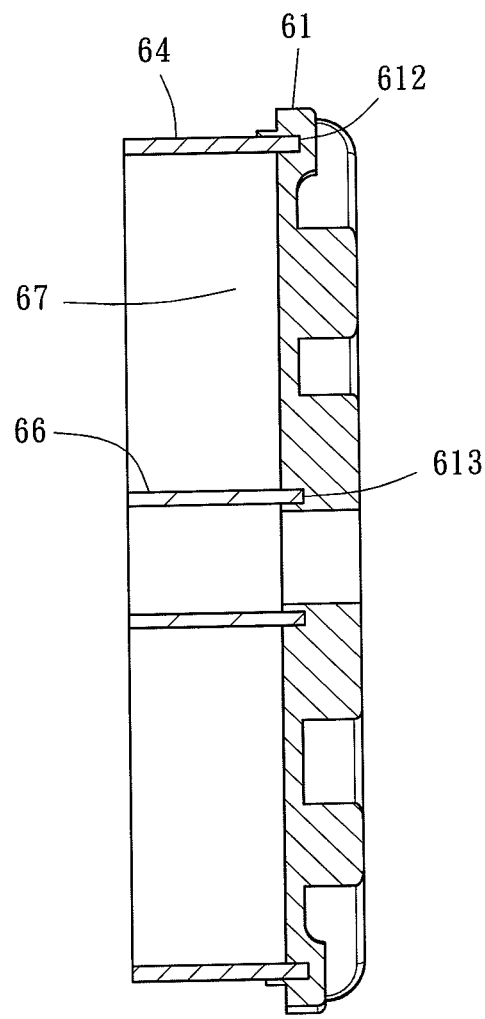
FIG. 4 shows a sectional view of a component part of a second preferred embodiment of the present invention, illustrating the assembly of the rear cover with the inner and outer circumferential walls.

Referring now to FIGS. 4~7. In a second preferred embodiment of the present invention, a motor 40 having an internal driver is provided and said motor 40 differs from the abovementioned first embodiment in that:

As shown in FIG. 4, a top edge of said inner circumferential wall 66 and a top edge of said outer circumferential wall 64 are of same height.

Figure 5:
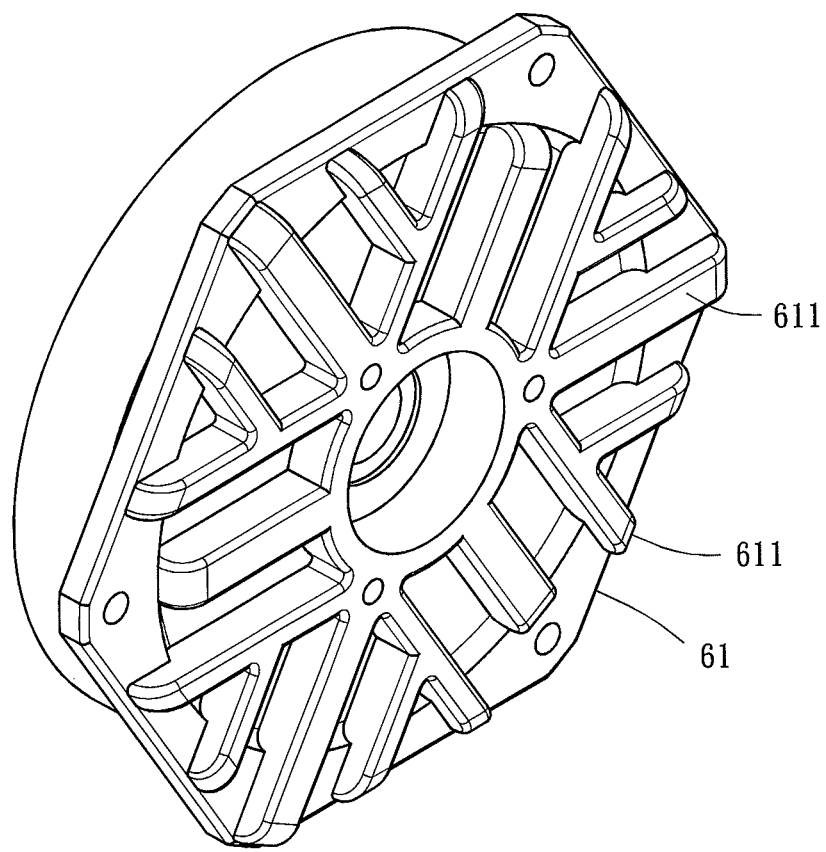
FIG. 5 shows a perspective view of a component part of a second preferred embodiment of the present invention, illustrating the outer surface of the rear cover.

As shown in FIG. 5, the outer surface of the rear cover 61 is provided with a plurality of heat-dissipating ribs 611 such that the heat dissipating surfaces are increased to enhance the heat dissipation.

Figure 6:
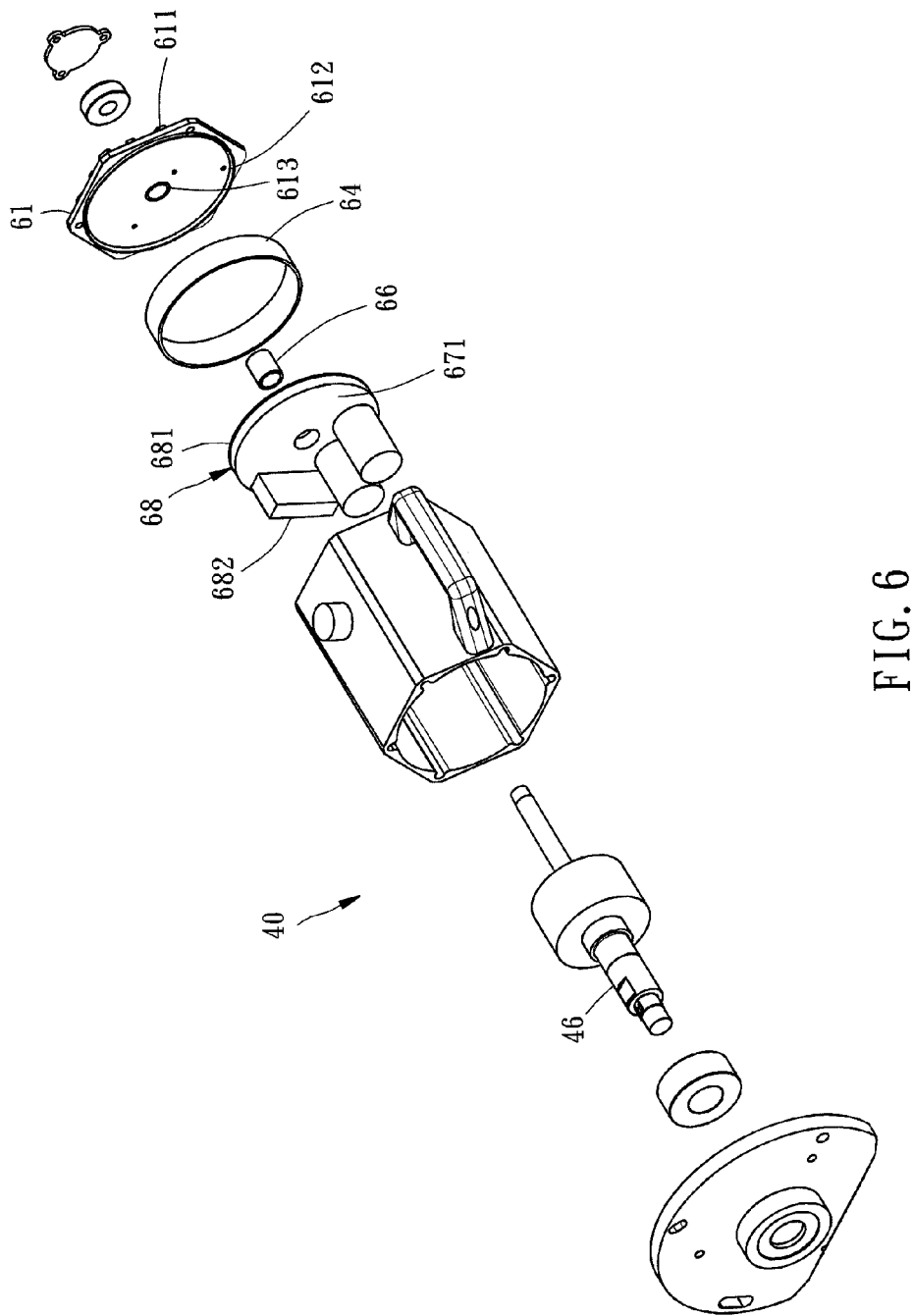
FIG. 6 shows an exploded view of a second preferred embodiment of the present invention.

As shown in FIG. 6, the receiving space 67 is filled with an encapsulant 671 and is cured such that said encapsulant 671 fills said space including the circuit board 681 and electronic components 682 of the driver 68, said inner circumferential wall 66, said outer circumferential wall 64 and said inner surface of said rear cover 61, and said encapsulant 671 is of a height less than top edges of said inner and outer circumferential walls 66, 64. In the second embodiment, since the top edges of said inner and outer circumferential walls 66, 64 are of the same height, the encapsulant 671 would not spill over to the external of the receiving space 67 and such that the electronic components 682 of a height shorter than the top edges of the inner and outer circumferential walls 66, 64 are being enclosed and held in place. Furthermore, the encapsulant 671 also exhibits the property of a heat conductor once cured such that the heat generated by the electronic components 682 can too be effectively conducted to the rear cover 61.

The second embodiment of the present invention also differs from the first embodiment in that the inner and outer circumferential walls 36, 34 are integrally formed with the rear cover 31 as one single piece. In the second embodiment of the present invention, the inner surface of the rear cover 61 comprises an outer circumferential slot 612 and an inner circumferential slot 613, said outer and inner circumferential walls 64, 66 are ring-shaped plates that are being inserted into said outer and inner circumferential slots 612, 613 respectively, which also forms a structure similar to the inner and outer circumferential walls 66, 64 of the first embodiment.

Figure 7:
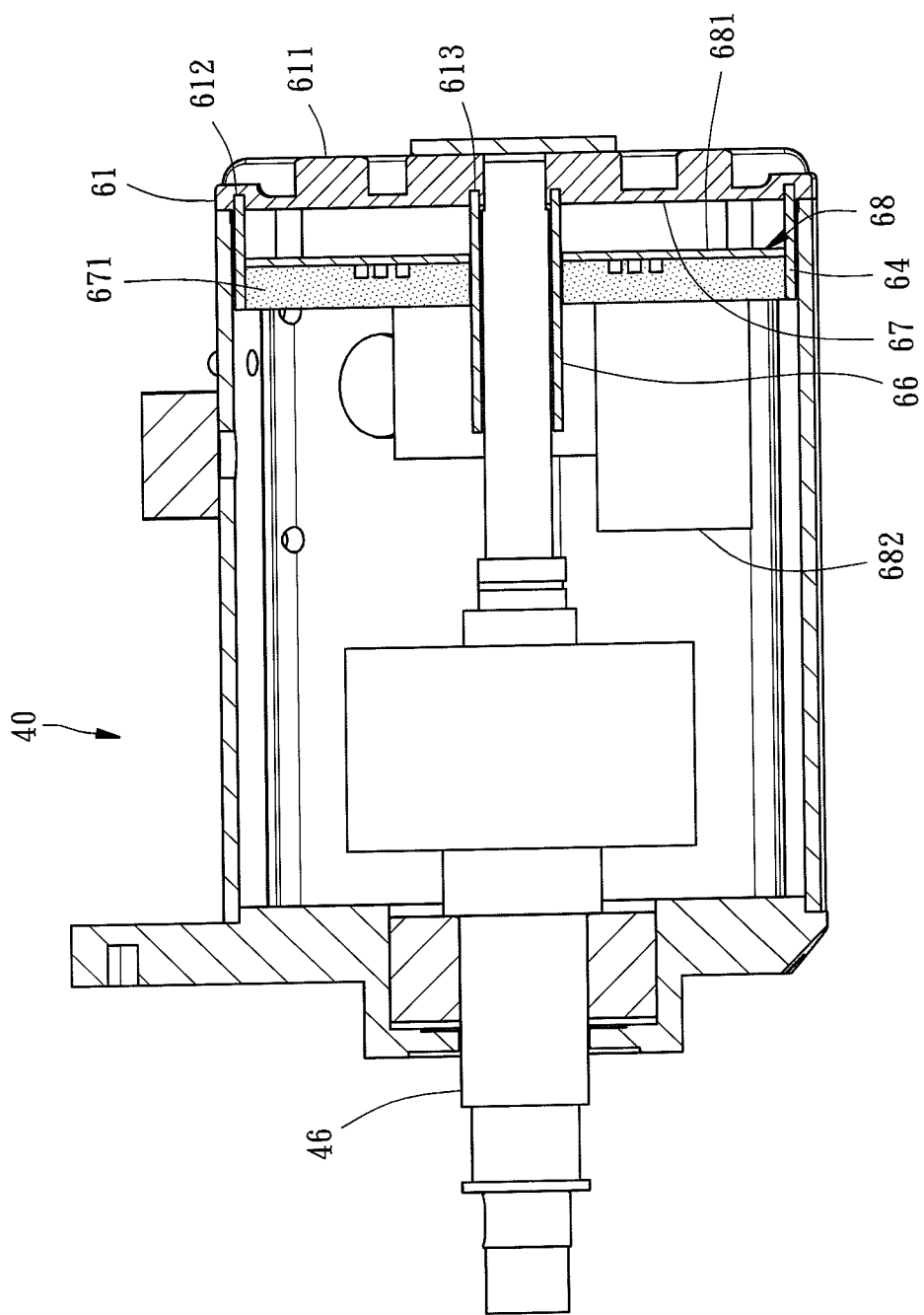
FIG. 7 shows a sectional illustrated view of a second preferred embodiment of the present invention, illustrating the relationship of the heights of the inner and outer circumferential walls.

As shown in FIG. 7, it can be understood that the top edge of the inner circumferential wall 66 can too be higher than the top edge of the outer circumferential wall 64 such that the enclosing or covering area of the drive shaft 46 by the inner circumferential wall 66 can be increased, which in turn would provide protection to the wires from interfering with the drive shaft 46 when the driver 68 and the coil (not shown) of the motor 40 are connected to each other via wires (not shown). As the connection of the wire to the coil of the motor 40 is a known common method, details is therefore omitted. Since the encapsulant 671 is of a height shorter than the top edge of the outer circumferential wall 64 and since inner circumferential wall 66 is higher than the outer circumferential wall 64, there is no need to consider or worry the height of the encapsulant 671 during its filling.

The technical effects that can be achieved by the rest of the structure of the second embodiment are similar to tones of the first embodiment and therefore their details are omitted.

Figure 8:
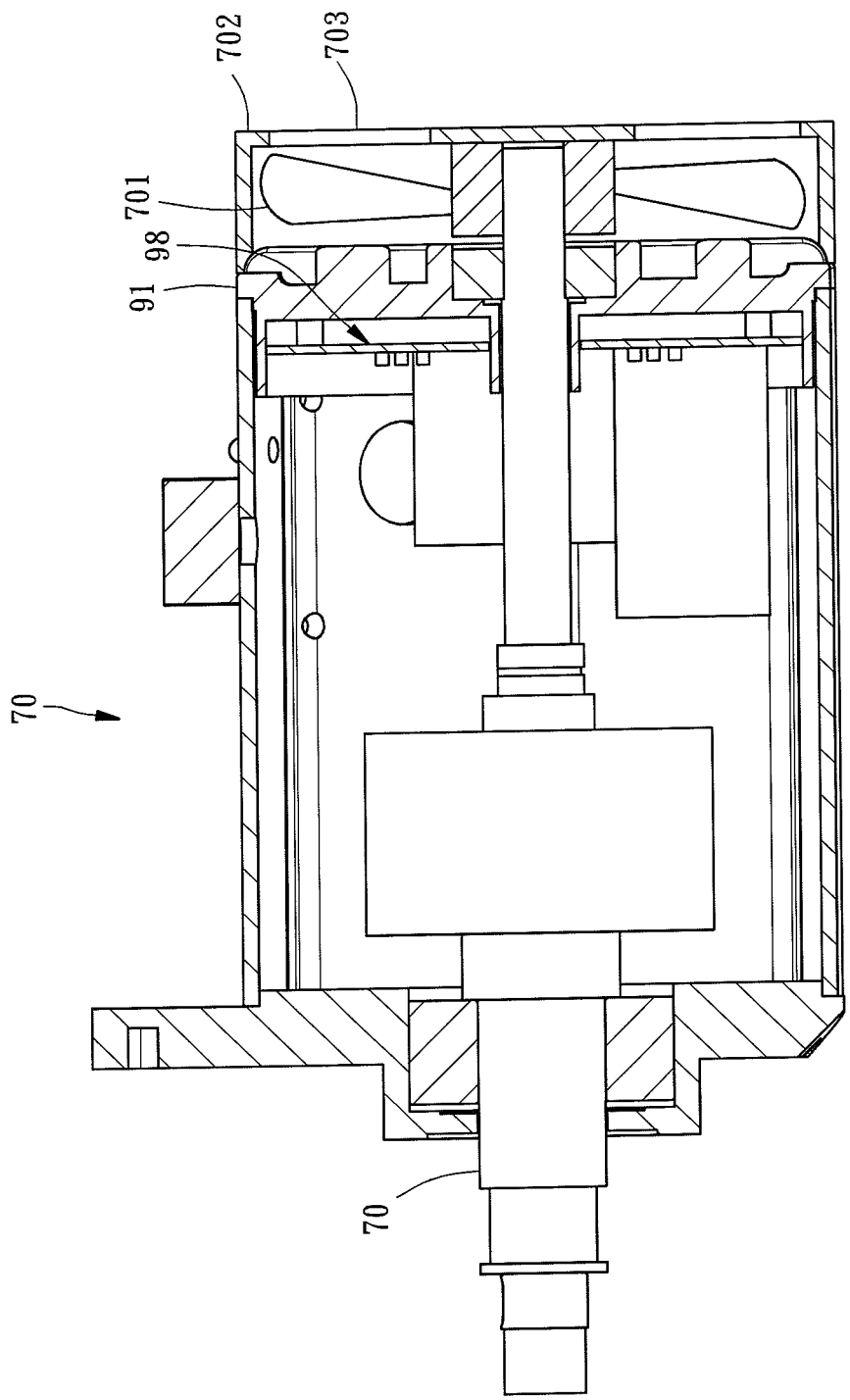
FIG. 8 shows a sectional illustrated view of a third preferred embodiment of the present invention.

Referring now to FIG. 8. In a third embodiment of the present invention, a motor 70 with an internal driver is provided. Said motor 70 differs from the first embodiment in that:

It further comprises a fan 701 and an outer cap 702.

The fan 701 is provided on an end of the drive shaft 76 and external to said rear cover 91. In practice, the fan 701 is electrically connected to the driver 98 and is controlled by the driver 98 to rotate such that air flow on the surface of the rear cap 91 can be induced to enhance the effect of heat dissipation.

The outer cap 702 covers said rear cover 91 and encompasses the fan 701 therein to provide protection thereof. In practice, the outer cap 702 can be configured with a plurality of air slots 703 to allow air to pass through and into the internal and to exist from the internal.

Despite the fact that the third embodiment additionally includes the fan 701 and outer cap 702, it can be understood that they are not necessary components to the embodiment since they are introduced as additions to enhance the effect of heat dissipation. If heat dissipation is not a concern to the operation of the motor 70 (such as a motor of small power output), there is no need for the fan 701 and outer cap 702.

The rest of the structures of the third embodiments are similar to the ones of the first embodiment and is therefore omitted.

What is claimed is:

1. A motor with an internal driver, comprising:
 a shell, having a stator, a rotor and a drive shaft attached to said rotor in an internal thereof;
 a front cover, covering a front end of said shell, and said front cover having a through hole formed thereon;
 a rear cover, covering a rear end of said shell, and defining an inner surface on a side attached to said internal of said shell and an outer surface on another side exposed externally, said rear cover having a through hole formed thereon;
 two ends of said drive shaft penetrating said through holes of said front and rear covers respectively and exposed externally;
 characterized in that:
 said inner surface of said rear cover comprises an outer circumferential wall provided on an edge thereof, and an inner circumferential wall provided on an edge of said through hole; a receiving space is defined by said outer circumferential wall, said inner surface of the rear cover and said inner circumferential wall;
 a driver arranged within said receiving space comprises a circuit board and a plurality of electronic components, said circuit board and said rear cover being parallel;
 said outer surface of the rear cover is provided with a bearing slot indented inwardly to receive a bearing therein, and said bearing slot is aligned with said through hole of said rear cover;
 an inner diameter of said inner circumferential wall is greater than the drive shaft to allow said drive shaft to pass therethrough, and said inner diameter of said inner circumferential wall is smaller than an annular diameter of said bearing received within said bearing slot, an external diameter of the inner circumferential wall of the rear cover is smaller than a diameter of the bearing slot.

2. The motor with an internal driver as claimed in claim 1, wherein a top edge of said inner circumferential wall and a top edge of said outer circumferential wall are of same height.

3. The motor with an internal driver as claimed in claim 1, wherein a top edge of said inner circumferential wall is higher than a top edge of said outer circumferential wall.

4. The motor with an internal driver as claimed in claim 1, wherein said receiving space is filled with an encapsulant and is cured such that said encapsulant fills said space including the circuit board and electronic components of the driver, said inner circumferential wall, said outer circumferential wall and said inner surface of said rear cover, and said encapsulant is of a height less than top edges of said inner and outer circumferential walls.

5. The motor with an internal driver as claimed in claim 1, wherein said circuit board of said driver is attached to said inner surface of said rear cover via a plurality of supporting spacers, such that the circuit board of said driver is spaced apart from the inner surface of said rear cover.

6. The motor with an internal driver as claimed in claim 1, wherein insulations are provided between said inner circumferential wall and said circuit board of the driver and between said outer circumferential wall and said circuit board of the driver.

7. The motor with an internal driver as claimed in claim 1, further comprises a fan, provided on an end of said drive shaft and external to said rear cover.

8. The motor with an internal driver as claimed in claim 7, further comprises an outer cap, covering said rear cover and encompassing said fan therein.

9. The motor with an internal driver as claimed in claim 7, wherein said outer surface of said rear cover is provided with a plurality of heat-dissipating ribs.

10. The motor with an internal driver as claimed in claim 1, wherein said outer and inner circumferential walls are formed on said inner surface of the rear cover along a normal direction thereof.

11. The motor with an internal driver as claimed in claim 1, wherein said inner surface of the rear cover comprises an outer circumferential slot and an inner circumferential slot, said outer and inner circumferential walls are ring-shaped plates inserted into said outer and inner circumferential slots respectively.

* * * * *